US010781126B2

(12) United States Patent
Demott et al.

(10) Patent No.: US 10,781,126 B2
(45) Date of Patent: Sep. 22, 2020

(54) BURNER FOR SUBMERGED COMBUSTION MELTER

(71) Applicant: KNAUF INSULATION, Vise (BE)

(72) Inventors: Gerard Demott, Majcichov (SK); Bostjan Marolt, Poljane (SI); David Ducarme, Wavre (BE)

(*) Notice: Subject to any disclaimer, the term of this patent is extended or adjusted under 35 U.S.C. 154(b) by 156 days.

(21) Appl. No.: 15/546,278

(22) PCT Filed: Jan. 27, 2016

(86) PCT No.: PCT/EP2016/051734
§ 371 (c)(1),
(2) Date: Jul. 25, 2017

(87) PCT Pub. No.: WO2016/120350
PCT Pub. Date: Aug. 4, 2016

(65) Prior Publication Data
US 2018/0339927 A1 Nov. 29, 2018

(30) Foreign Application Priority Data
Jan. 27, 2015 (GB) .................................. 1501310.5

(51) Int. Cl.
C03B 5/235 (2006.01)
C03B 5/12 (2006.01)
(Continued)

(52) U.S. Cl.
CPC ............. C03B 5/2356 (2013.01); C03B 5/12 (2013.01); C03B 5/44 (2013.01); F23C 3/004 (2013.01);
(Continued)

(58) Field of Classification Search
CPC ... C03B 5/00; C03B 2211/20; C03B 2211/22; C03B 2211/23; C03B 2211/40; C03B 2211/60; C03B 2211/62; F23D 14/583
See application file for complete search history.

(56) References Cited

U.S. PATENT DOCUMENTS 3,363,663 A * 1/1968 Porter ................. C03B 23/0086
431/158
4,366,571 A * 12/1982 Palmquist ............... C03B 5/425
373/30

(Continued)

FOREIGN PATENT DOCUMENTS

| DE | 19757480 | 6/1999 |
| JP | H01121611 | 5/1989 |
| WO | 2013147402 | 10/2013 |

Primary Examiner — Cynthia Szewczyk
(74) Attorney, Agent, or Firm — Knauf Insulation, Inc.; James K. Blodgett; Brandon N. Hudder

(57) ABSTRACT

The invention relates to a submerged combustion burner (1) and to a melter comprising submerged combustion burners (1). The burner comprises a substantially parallelepipedic body, the melt oriented face of which shows a longitudinal slot, two opposite walls of the slot comprising a series of nozzles each supplied separately with fuel and oxygen containing gas. The slot advantageously shows a narrow opening comprised between 10 and 30 mm, preferably between 15 and 25 mm, most preferably about 20 mm. The burner is advantageously made of steel plates, preferably high temperature resistant steel. The walls of the slot as well as the melt oriented face of the burner are advantageously cooled. According to the invention, the parallelepipedic burner body comprises a first external longitudinal volume showing a generally U-shaped cross-section and a second internal longitudinal volume fitted within the said first external longitudinal volume, showing also a generally U-shaped cross-section, one of the longitudinal volumes (Continued)

Figure 1:
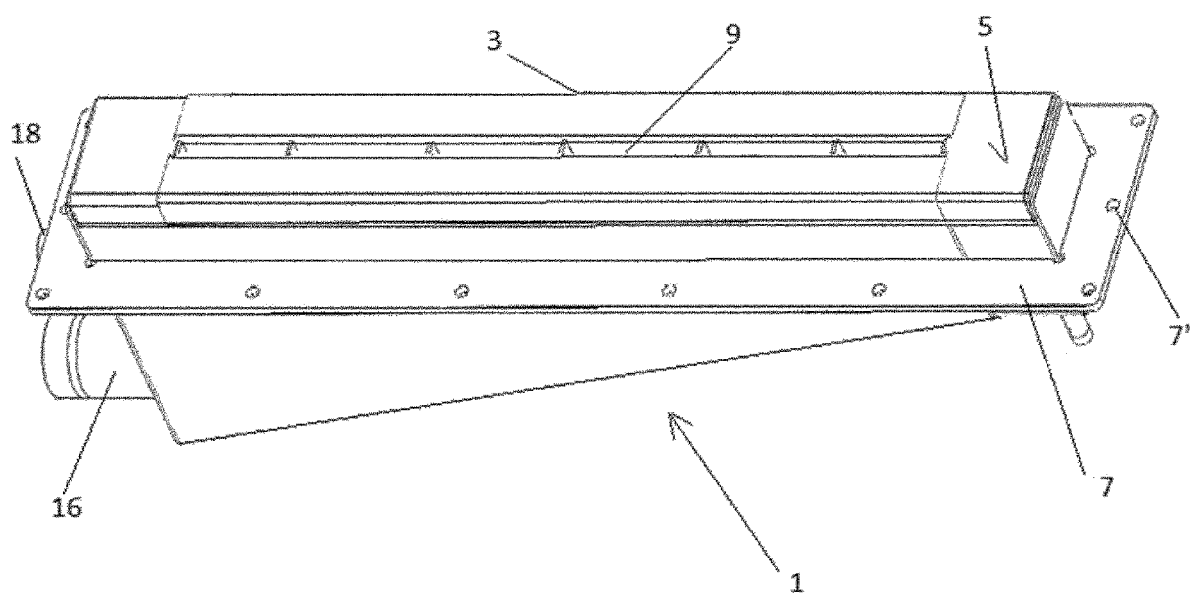

comprising a connection to a supply of oxygen and the other comprising a connection to a supply of fuel gas. The ends of the branches of the longitudinal volumes are connected to the burner nozzles. A flange is arranged around the parallelepipedic burner body at a distance from the melt oriented face of said body.

18 Claims, 6 Drawing Sheets

(51) Int. Cl.
    *C03B 5/44* (2006.01)
    *F23C 3/00* (2006.01)
    *F23D 14/22* (2006.01)

(52) U.S. Cl.
    CPC .......... *F23D 14/22* (2013.01); *C03B 2211/23* (2013.01); *Y02P 40/55* (2015.11)

(56) References Cited

U.S. PATENT DOCUMENTS

| | | | | |
|---|---|---|---|---|
| 5,545,031 | A * | 8/1996 | Joshi | F23D 14/22 239/424 |
| 5,833,447 | A * | 11/1998 | Bodelin | C03B 5/2353 431/10 |
| 5,975,886 | A * | 11/1999 | Philippe | F23C 5/14 431/10 |
| 6,126,438 | A * | 10/2000 | Joshi | F23C 7/002 110/336 |
| 2001/0023053 | A1* | 9/2001 | Hoke, Jr. | C03B 5/2353 431/8 |
| 2014/0208800 | A1* | 7/2014 | McCann | C03B 5/2356 65/29.18 |
| 2015/0000343 | A1* | 1/2015 | Lefrere | C03B 5/44 65/134.4 |

* cited by examiner

BURNER FOR SUBMERGED COMBUSTION MELTER

CROSS-REFERENCE TO RELATED APPLICATIONS

This application is a U.S. national counterpart application of International Application Serial No. PCT/EP2016/051734, filed Jan. 27, 2016, under 35 U.S.C. § 371, which claims priority to GB Application Serial No. 1501310.5, filed Jan. 27, 2015, the disclosures of which are hereby incorporated herein by reference.

The present invention relates to a burner for use in a submerged combustion melter, and to a submerged combustion melter, notably for melting vitreous or vitrifiable material, equipped with such burners.

Vitreous materials are generally manufactured from a mixture of raw materials, for example silicates, basalt, limestone, soda ash and/or other minor constituents which are introduced into a melter and melted into a viscous liquid state at temperatures in the order of 1250 to 1500° C.; the melt is then supplied to a forming process. Depending on the intended use of the melt, for example for manufacture of flat glass, hollow glass, continuous fibers for reinforcement purposes or fibers for insulation purposes, an appropriate further melt refining step may be required upstream of the forming process. The chemical composition of the melt and its physical properties are selected as a function of the intended use and the forming process.

Conventional glass melters comprise an energy supply from above a glass melt surface, for instance from burners generating a flame in a space between the glass melt surface and a crown of the melter, whereby heat is transferred to the glass melt by the flame itself and by radiation from the crown material. Raw batch material to be melted is loaded at the top of the glass melt in the melter and heat is transferred from the melt to the batch material which is incorporated into the melt.

In some glass melters, energy is supplied by electrically heated electrodes arranged below the surface of the melt; such electrodes may provide the only heat source or be used in combination with burners.

Glass melters used to manufacture stone wool insulation have traditionally been cupola furnaces.

In submerged combustion melting raw materials are generally melted by introducing fuel and oxygen containing gas through the mass of molten material, causing said fuel and oxygen to mix and burn within said mass, melting additional raw material by the heat generated by the burning gas-fuel mixture. In an alternative, fuel and air and/or oxygen are burned outside the said mass and the hot combustion gases are blown into the glass melt.

Conventional burners used for submerged combustion generally produce a flame that shows a tendency to become unstable, particularly under extreme conditions of agitation in a glass melt. Conventional burners for submerged combustion melting of vitrifiable material generally comprise concentric pipe burners, also called tube-in-tube burners. The inner tube generally is designed for blowing the fuel, preferably gas, and the outer tube is designed for blowing the oxidant.

Known submerged combustion burners generate high agitation and elevated material velocities in the melt bath of the submerged combustion melter.

A further design of known submerged combustion burners shows an alignment of nozzles connected to a common air-fuel mixture supply or each connected separately to an oxygen containing gas supply and to a fuel supply.

The present invention now seeks to provide an improved submerged combustion burner capable of generating burner flames that show good flame stability, and reduced agitation in the melt bath. The invention further seeks to provide an improved submerged combustion melter that shows appropriate agitation of the melt bath.

The submerged combustion burner may be used in a method and/or melter disclosed in any of WO 2015/014917, WO 2015/014918, WO 2015/014920 or WO 2015/014921, each of which is hereby incorporated by reference The submerged combustion burner of the invention comprises a substantially parallelepipedic body, the melt oriented face of which shows a longitudinal slot, two opposite walls of the slot comprising a series of nozzles supplied separately with fuel and oxygen containing gas. The fuel preferably comprises fuel gas. It is preferred to supply these materials separately, allowing for appropriate mixture in the nozzles, prior to combustion in the slot and/or in the melt. The design of the invention burner distributes the flame or flames over the length of the slot, thus increasing the contact and exchange surface between flames and/or combustion products with melt, and hence improving the energy transfer between flames and/or combustion products and melt. Further, compared to tube-in-tube burners, the speed at which the combustion products are actually injected into the melt is advantageously reduced while still maintaining sufficient agitation and stirring of the melt to benefit from the advantages of submerged combustion. Because of the nozzles being oriented in a direction transversal to the direction of the flames escaping the burner, the risk of molten glass entering defect nozzles and blocking same is reduced. This risk is further reduced because of the narrow opening of the slot.

The slot advantageously shows a narrow opening. It has been found that an opening between 10 and 30 mm, preferably between 15 and 25 mm, most preferably about 20 mm is suitable.

The burner is advantageously made of steel plates, preferably high temperature resisting steel as may suitably be selected by the person skilled in the art. The walls of the slot are advantageously cooled by a cooling liquid, preferably water. Similarly, the melt oriented face of the burner which is in contact with the melt is also preferably cooled by a cooling liquid. The heat energy withdrawn by way of the cooling liquids may advantageously be recovered for any suitable purpose.

According to a preferred embodiment of the invention, first and second longitudinal conducts are provided at each longitudinal side of the slot; the first longitudinal conduct being connected to an oxygen source, such as oxygen enriched air or industrial grade oxygen, and to the nozzles arranged in the corresponding sidewall of the slot, and the second longitudinal conduct being connected to a fuel source and to the nozzles arranged in the corresponding sidewall of the slot.

In an alternative preferred embodiment, the parallelepipedic burner body comprises a first external longitudinal volume showing a generally U-shaped cross-section and a second internal longitudinal volume fitted within the said first external longitudinal volume, showing also a generally U-shaped cross-section, one of the longitudinal volumes comprising a connection to a supply of oxygen or oxygen enriched air and the other comprising a connection to a supply of fuel, preferably fuel gas, the ends of the branches of the longitudinal volumes comprising fluid connections to the burner nozzles. The first external longitudinal volume transports oxygen or oxygen enriched air and the second internal longitudinal volume transports fuel.

The nozzles are advantageously arranged at a distance from the melt oriented face of the burner, which corresponds to 1 to 3 times the width of the slot.

According to a preferred embodiment, the series of nozzles arranged in one of the opposite side walls of the slot are offset versus the series of nozzles arranged in the other opposite side wall of the slot. This particular arrangement ensures high gas turbulence in the slot and a dispersion of the flame over the whole length of the slot, thereby inhibiting penetration of melt into the slot.

The slot advantageously reaches at a distance of 1 to 10 times, preferably 1 to 5 times, its width below the level of the nozzles defined by the line going through the center of the nozzles arranged on one sidewall of the slot. It has been found that by increasing the volume of the slot, the stability of the flames is improved. In addition, should despite all due care melt enter into the slot, the depth of the slot allows for accumulation of melt before the nozzles get plugged.

Advantageously, a flange is arranged around the parallelepipedic burner body at a distance from the melt oriented face of said body. The flange is designed to fasten the burner to the melter bottom or side wall, below the level of the melt. The flange is advantageously arranged at a distance from the melt oriented face in order for the burner to traverse the burner bottom or side wall, and possibly further to allow the burner to protrude within the melter, generating flames at distance from the burner bottom or side wall, in order to reduce corrosion of the relevant melter wall at burner proximity.

According to another aspect, the present invention further provides a submerged combustion melter comprising melter bottom and side walls, a raw material discharge and a melt outlet and at least one burner arranged below the level of the melt, at least one of the said burners being a burner as described here above. Preferably, at least two or more preferably at least three, at least four or at least five and/or less than 20, less than 18, less than 16, less than 14, less than 12 or less than 10 of such submerged burners are provided in the melter, preferably at the bottom of the submerged combustion melter.

It has been found that the burner design allows for a reduced gas speed at which the combustion gases escape out of the burner, with concomitant reduction of material velocities in the melt bath and hence reduced agitation in the melt bath while still ensuring appropriate melt stirring and homogeneity in terms of composition and temperature. In addition, compared to known tube-in-tube or tube-in-tube-in-tube burners, the combustion gas outlet is spread over a larger amount of smaller openings, thus creating smaller flames with the consequence of increased contact surfaces between flame and glass melt, and improved energy transfer from the burner to the melt.

Furthermore, the arrangement of the burner nozzles laterally, on side walls of a slot reduces the risk of the burner being plugged with hardening or hardened melt in exceptional or extreme or transitional situations.

The burner and/or the melter may be adapted and/or configured to sinter and/or melt raw materials. It may be a "glass melter", that is to say a melter adapted and configured to melt glass-like materials including materials selected from glass, vitreous materials, stone and rock. A glass melter may be used to manufacture flat glass, hollow glass, glass fibers, continuous fibers for reinforcement purposes, mineral fibers for insulation purposes, mineral wool, stone wool or glass wool. The melter may be used to transform raw materials to manufacture frits, cement clinker, notably alumina cement clinker, or abrasives, notably abrasives produced by melting. The melter may be used to transform raw materials, notably by vitrification, for example: vitrification of medical wastes; vitrification of ash, notably from incinerators; vitrification of powders, for example dusts from cast iron or other metal foundries; vitrification of galvanic sludge, tannery sludge or mining industry waste; disposal of waste, notably by vitrification, for example, of polluted soil, soil polluted by heavy metals or tar, clay filters, sludge, activated carbon, radioactive waste, slags containing lead or zinc, refractories, notably refractories containing chromium. Particularly in the case of a glass melter, the raw materials may comprise: silicates, basalt, limestone, soda ash, zeolite catalyst, spent catalyst, spent pot liner, refractory materials, aluminum dross, aluminum melting scum, sand based fire extinguisher waste, sludge, galvanic sludge, clinker, waste materials, ash and combinations thereof.

The melt within the melter during operation may reach a temperature, notable a temperature at which it is removed from the melter, which is at least 1100*C, at least 1200° C. or at least 1250° C. and which may be no more than 1650° C., no more than 1600° C., no more than 1500° C. or no more than 1450° C.

The fuel may be solid or liquid but may advantageously be fuel gas, such as natural gas, propane and/or butane.

The burner may further comprise a connection to an inert gas source, notably a nitrogen source or a source of compressed air. If burning is interrupted, it may be desired to blow high pressure inert gas through the burner assembly instead of oxidant and/or fuel gas in order to prevent material, for example melt, notably liquid glass from entering the burner and solidifying within it.

There is thus also provided a method of introducing a flame and/or combustion products from a submerged combustion burner into a melt through a slot. Such burners are particularly suitable for use in submerged combustion melters, for example for the manufacture of glass fibers, mineral wool fibers, glass wool fibers and stone wool fibers. Particularly in such cases, said burners are generally arranged through the bottom of submerged combustion melters and may slightly extend within the liquid glass bath. Suitable cooling of the end extending through the furnace bottom thus protects the burner from excessive wear.

The operating pressure of such a submerged combustion burner, that is the pressure of the gasses generated inside the burner needs to be sufficient for the gasses to overcome the liquid pressure in the melt and thus bubble up through the melt and generate an agitated melt. Advantageously, the pressures are controlled in such a way that melt particles reach a speed of up to 2 m/s. The melt and/or the raw materials within the melter may reach a speed which is $\geq 0.1$ m/s, $\geq 0.2$ m/s, $\geq 0.3$ m/s or $\geq 0.5$ m/s and/or which is $\leq 2$ m/s, $\leq 1.8$ m/s or $\leq 1.5$ m/s.

The speed of the combustion and/or combustible gases, notably at the exit from the burner nozzle(s), may be $\geq 20$ m/s, $\geq 30$ m/s, $\geq 40$ m/s, $\geq 50$ m/s, $\geq 60$ m/s, and/or $\leq 100$ m/s. Preferably the speed of the combustion gases is such as to show cold velocity target of 15-45 m/s, which is believed to ensure effective heat transfer to the melt. Cold velocity target is understood to mean the velocity of the gases at ambient temperature, that is not being ignited.

The oxygen containing gas may be air but is preferably oxygen, technical grade oxygen for example gas having an oxygen content of at least 95% by weight or oxygen enriched air.

Preferably, the injected gas keeps the molten mass in a state of agitation and turbulence, that is a bubbly mass. The heat transmission is thus significant and the stirring of the bath is favorable to the homogeneity of the finished product. The fumes escaping from the bath may be kept under high pressure and may travel through fresh raw material in order to promote heat exchange and preheat said raw material, prior to any treatment and evacuation to the environment.

The height of a melt pool within the melter, especially when the melting chamber is substantially cylindrical, preferably with an internal diameter of the melting chamber of 1.5 m to-3 m, more preferably 1.75 to 2.5 m, may be: ≥about 0.75 m, ≥about 0.8 m, ≥about 0.85 m or ≥about 0.9 m; and/or
≤about 2.2 m, ≤about 2 m, ≤about 1.8 m, or ≤about 1.6 m.

The submerged combustion melter may have a number of such submerged combustion burners which is ≥2, ≥3, ≥4 or ≥5 and/or ≤20, ≤18, ≤15, ≤12 or ≤10.

The composition of the melt produced by the submerged combustion in the case of a glass melter may comprise one or more of:

|  | Possible melt composition (% weight) | Preferred melt composition (% weight) |
| --- | --- | --- |
| $SiO_2$ | 35-70 | 40-65 |
| $Al_2O_3$ | 5-30 | 15-25 |
| CaO | 5-20 | 5-12 |
| MgO | 0-10 | 1-7 |
| $Na_2O$ | 0-20 | 5-18 |
| K2O | 0-15 | 0-10 |
| $Fe_2O_3$ (total iron) | 0-15 | 0.5-10 |
| $B_2O_3$ | 0-10 | 0-5 |
| $TiO_2$ | 0-5 | 0-2 |
| $P_2O_5$ | 0-3 | 0-2 |
| MnO | 0-3 | 0-2 |
| $Na_2O + K_2O$ (alkali metal oxide) | 5-30 | 5-20 |
| CaO + MgO (alkaline earth metal oxide) | 5-30 | 5-20 |
| SiO2 + Al2O3 | 50-85 | 60-80 |

Figure 2:
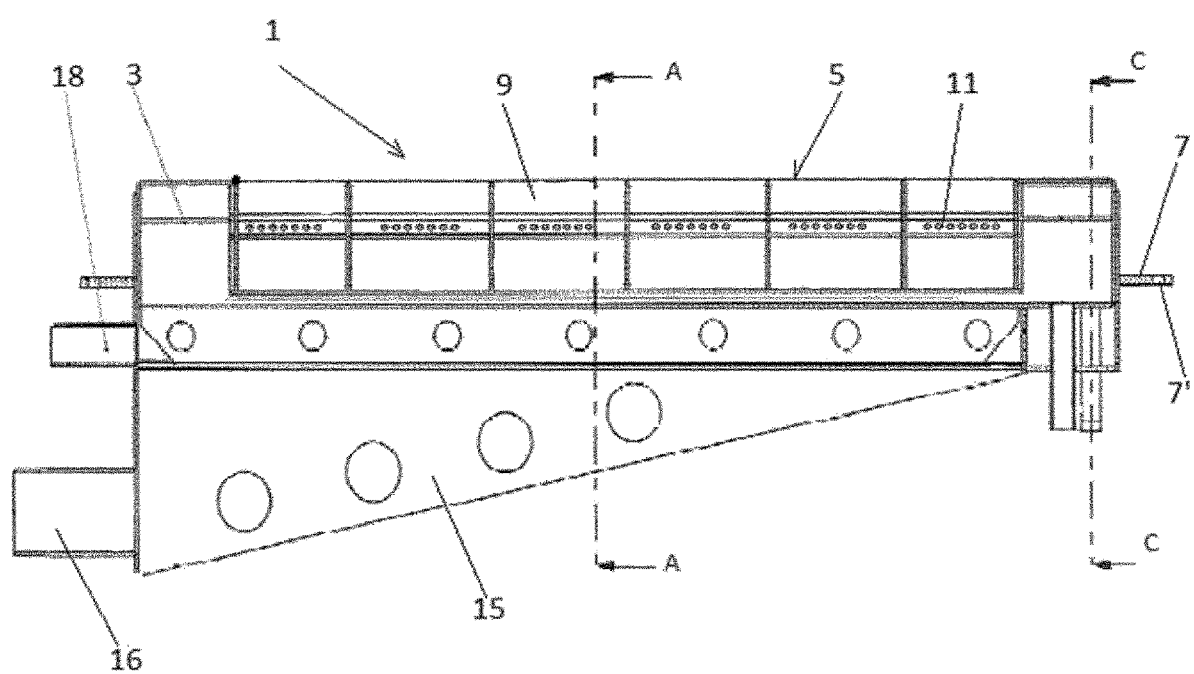
Figure 3:
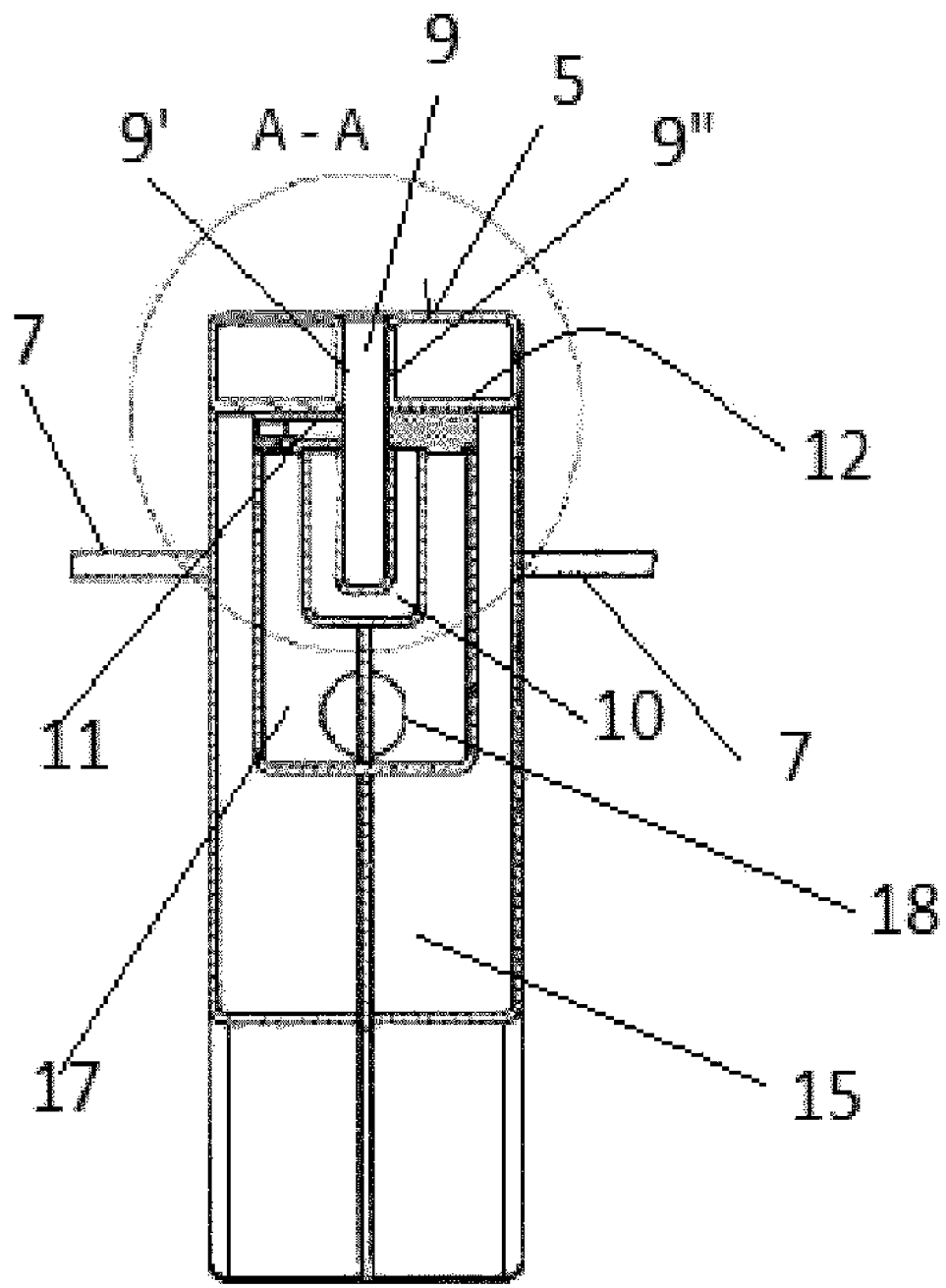
Figure 4:
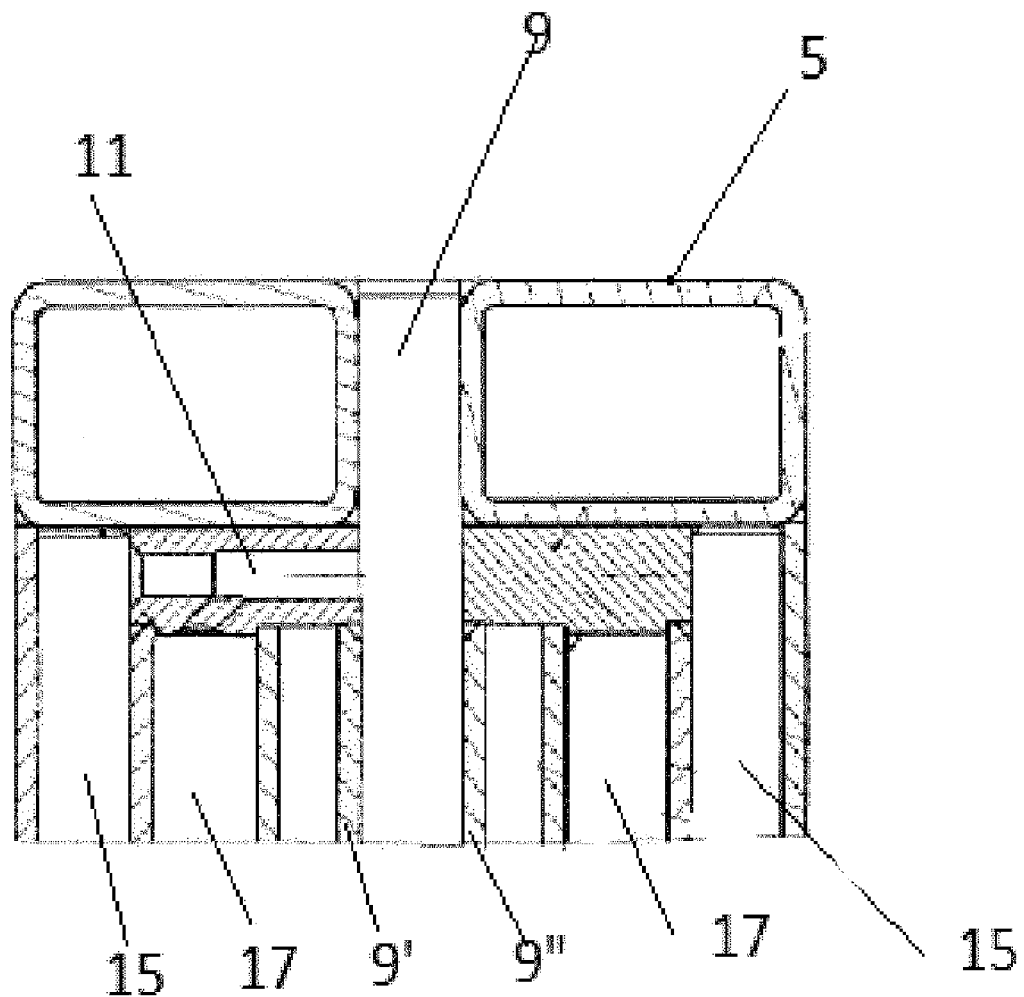
Figure 5:
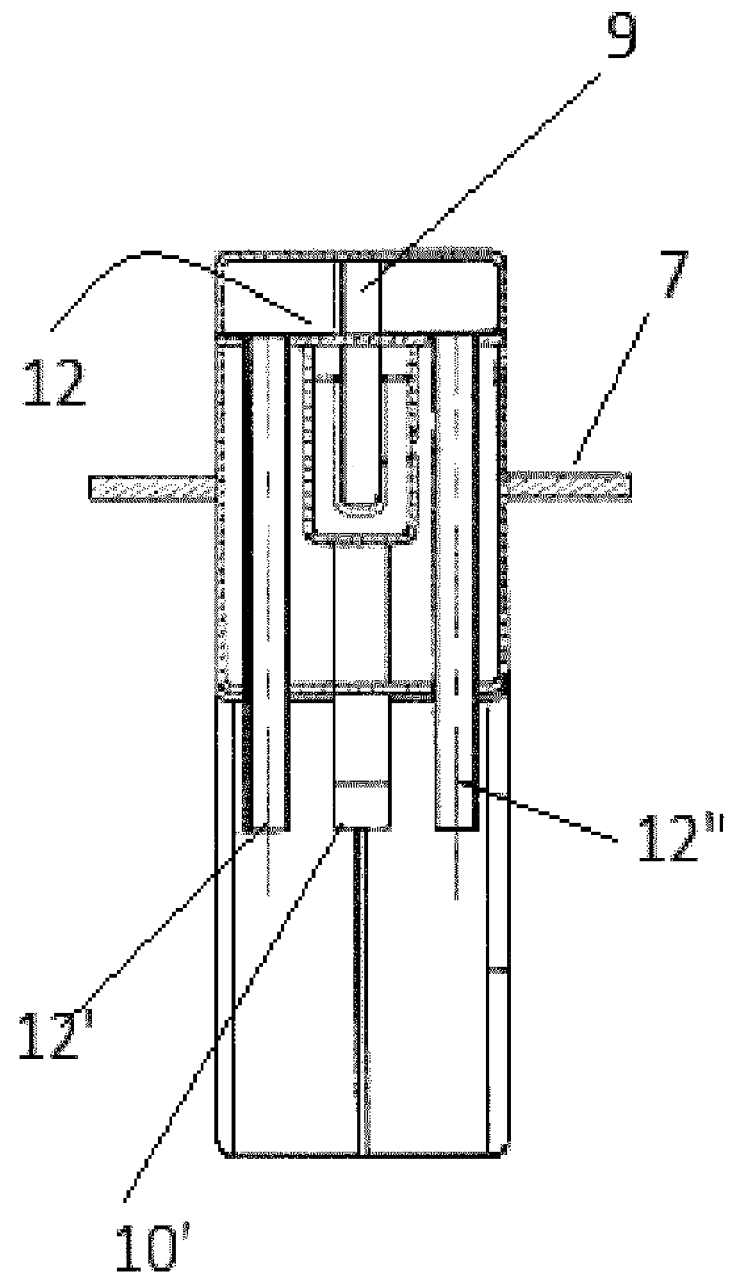
Figure 6:
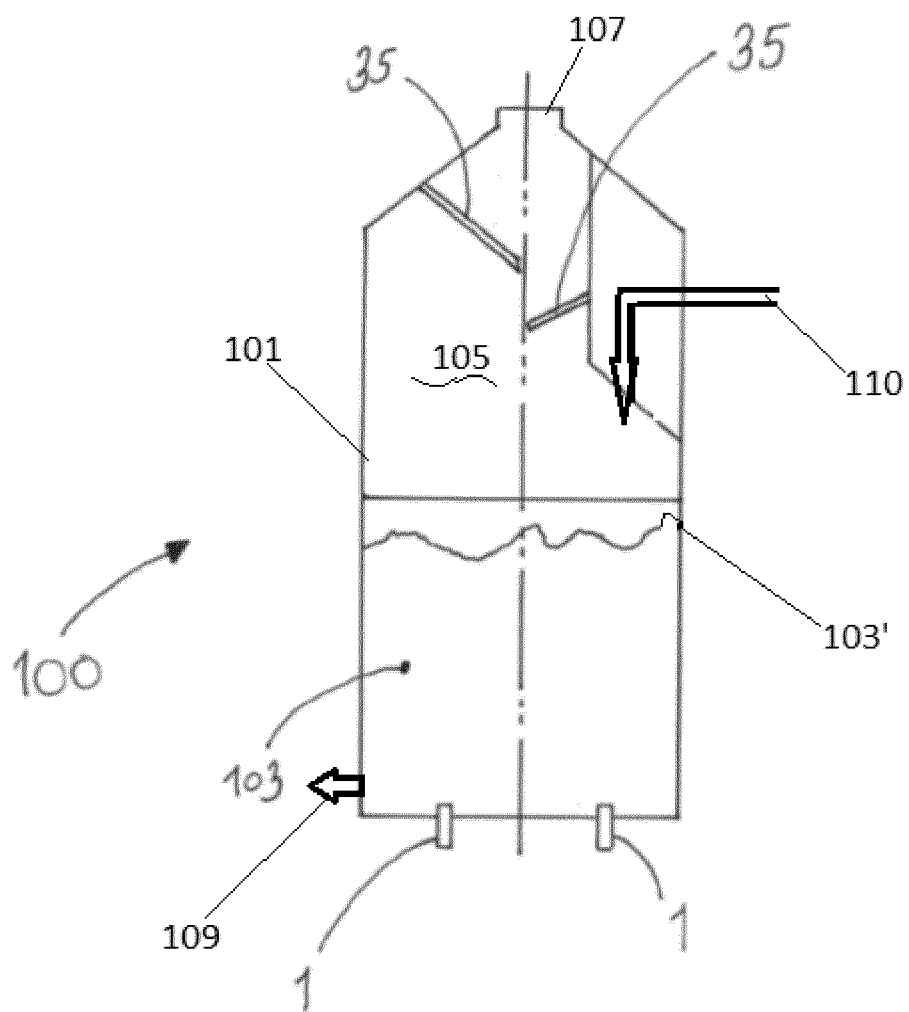

The present invention will be described in more details with reference to the attached drawings of which:

FIG. 1: is a perspective view of a preferred embodiment of a burner of the invention;

FIG. 2: is a longitudinal cross section through a submerged combustion burner of the invention;

FIG. 3: is a transversal cross-section through a submerged combustion burner of the invention, according to line A-A of FIG. 2;

FIG. 4: is an enlarged view of the top of FIG. 3;

FIG. 5: is a transversal cross-section through a submerged combustion burner of the invention, according to line C-C of FIG. 2; and FIG. 6 shows a schematic representation of a melter of the invention.

The burner shown in FIG. 1 has a substantially parallelepipedic body 3 with a melt oriented surface 5 and comprises a flange 7 for mounting of the burner in a melter bottom or side wall. With reference more specifically to FIGS. 2, 3 and 5, it is shown that the melt oriented face 5 comprises a slot 9. A series of aligned burner nozzles 11 is arranged in the longitudinal side walls 9' and 9" of slot 9. The lower part of slot 9 is enveloped by a double wall 10 defining a space with walls 9' and 9" of slot 9 in which cooling fluid, such as water, is circulated. At the top of the burner, a double wall 5,12 defines a further space for circulation of cooling fluid which cools the melt oriented face at the top of the burner, which is in contact with fluid melt. The relevant cooling spaces are interconnected and comprise inlet connecting pipes 12' and 12" to be connected to a cooling fluid source, as well as an outlet connecting pipe 10'. The nozzles are advantageously arranged at a distance from the melt oriented face of the burner, which corresponds to 1 to 3 times the width of the slot, between the cooling space at the melt oriented face of the burner and the cooling space enveloping slot 9. Opposite nozzles are preferably offset to each other. The substantially paralletepipedic body of the burner comprises two longitudinal volumes of substantially U-shaped cross-section, a first external volume 15 and a second internal volume 17 nested inside the U shape of the first volume 15. The end of the branches of the U-shape of the first volume 15 are connected to the burner nozzles 11. Similarly, the end of the branches of the U-shape of the second volume 17 are also connected to the burner nozzles 11. The first volume 15 is designed to transport oxygen and comprises a connection 16 to an oxygen supply. The second volume 17 is designed to transport fuel gas and comprises a connection 18 to a fuel gas supply. As is more apparent on FIG. 4, oxygen and fuel gas are mixed in nozzle 11 prior to injection into slot 9. The connections 16 and 18 are shown as longitudinally oriented lateral connections. In the alternative, connection 16 and/or connection 18 can also be provided as vertical connection, for example depending on the arrangement of the burner in the melter for which it is intended.

The burner is particularly suitable for a submerged combustion melter such as a melter shown in FIG. 5. A submerged combustion melter 100 may comprise at least one submerged combustion burner 1 as described. The combustible or combustion gases are distributed over a larger number of nozzle outlets, with concomitant increase of number of flames and hence exchange area for energy transfer between gas and melt.

The burners may be arranged through a wall or preferably a bottom of a submerged combustion melter and fastened thereto by a mounting flange 7 adapted for securing it into a furnace bottom, for instance by means of screws or other fasteners guided through an appropriate number of flange fastening holes 7' in order to tightly fasten the burner 1 at a furnace wall. The distance between the mounting flange 7 and melt oriented face 5 of the burner is sufficient for the burner to traverse the melter wall or bottom and to protrude into the melter. This arrangement allows to maintain the burner flames at a desired distance from the relevant wall or bottom. Suitable cooling of the burner as described above thus protects the burner from excessive wear.

A submerged combustion melter of the invention comprises a furnace comprising a melting chamber 101 equipped with at least one burner 1 as described, which contains a melt 103 and communicates with an upper chamber 105 and a chimney 107 for evacuation of fumes. These hot gases may be used to preheat the raw material and/or the fuel gas and/or oxidant used in the burners. The fumes escaping from the bath may be kept under high pressure and may travel through fresh raw material in order to promote heat exchange and preheat said raw material. The fumes generally are filtered prior to release to the environment, optionally following dilution with fresh air to reduce their temperature.

The injected gas keeps the molten mass in a state of agitation, that is a bubbly mass. The heat transmission is thus significant and the stirring of the bath is favorable to the homogeneity of the finished product. Because of the relatively high number of flames, the energy exchange area between gas and melt is increased compared to conventional burners; this can further improve the energy efficiency of the melter.

The melt may be withdrawn from the melt chamber 101 through a controllable outlet opening 109 preferably located in the furnace chamber side wall, essentially opposite a raw material feeder device 110.

The furnace wall advantageously comprises a double steel wall cooled by a cooling fluid, preferably water. Cooling water connections are provided at the external furnace wall. The flow of cooling liquid is preferably sufficient to withdraw energy from the inside wall such that melt can solidify on the internal wall and the cooling liquid, here water, does not boil.

If so desired, the furnace may be mounted on dampers which are designed to absorb vibrational movements.

The melter is particularly advantageous for manufacture of glass fibers, mineral wool, glass wool or stone wool. Its energy efficiency reduces energy consumption and its flexibility allows for easy change of raw material composition. Its ease of maintenance and low capital cost are also advantageous.

What is claimed is:

1. A submerged combustion burner (1) comprising:
   a parallelepipedic burner body (3), a melt oriented face (5) and a longitudinal slot (9),
   wherein each of the two opposing walls of the longitudinal slot (9', 9") comprises a series of burner nozzles (11) oriented in a direction transversal to the direction of the flames escaping the submerged combustion burner, and
   wherein each nozzle is individually supplied with fuel and oxygen comprising gas.

2. The submerged combustion burner of claim 1, wherein the longitudinal slot (9) comprises an opening of about 10 to about 30 mm.

3. The submerged combustion burner of claim 1, wherein the burner nozzles (11) are arranged at a distance of about 1-3 times the width of the longitudinal slot (9) from the melt oriented face (5) of the submerged combustion burner.

4. The submerged combustion burner of claim 1, wherein the series of burner nozzles (11) arranged in the first (9') of the opposite side walls of the slot (9) are offset versus the series of burner nozzles (11) arranged in the second of the opposite side walls (9") of the slot.

5. The submerged combustion burner of claim 1, wherein the longitudinal slot (9) reaches at a distance of about 1 to about 10 times its width below the level of the burner nozzles (11) as defined by a line going through the center of the burner nozzles (11) arranged on one sidewall of the longitudinal slot (9).

6. The submerged combustion burner of claim 1, wherein the submerged combustion burner (1) further comprises steel plates.

7. The submerged combustion burner of claim 1, wherein the walls (9', 9") of the longitudinal slot (9) are cooled by a cooling fluid.

8. The submerged combustion burner of claim 1, wherein the melt oriented face (5) of the submerged combustion burner (1) is cooled by a cooling fluid.

9. The submerged combustion burner of claim 1, wherein first and second longitudinal conducts (15, 17) are provided at each longitudinal side of the longitudinal slot (9), wherein the first longitudinal conduct is connected to an oxygen source and to the burner nozzles (11) arranged in the corresponding sidewall of the slot, and wherein the second longitudinal conduct is connected to a fuel source and to the burner nozzles (11) arranged in the corresponding sidewall of the longitudinal slot (9).

10. The submerged combustion burner of claim 1, wherein the parallelepipedic burner body (3) comprises a first external longitudinal volume (15) comprising a U-shaped cross-section, and a second internal longitudinal volume (17) fitted within the first external longitudinal volume and comprising a U-shaped cross-section, wherein the first external longitudinal volume (15) comprises a connection (16) to a supply of oxygen containing gas, and the second internal longitudinal volume (17) comprises a connection (18) to a supply of fuel, and wherein the ends of the branches of the first external and second internal longitudinal volumes (15, 17) comprise fluid connections to the burner nozzles (11).

11. The submerged combustion burner of claim 10, wherein the first external longitudinal volume (15) transports oxygen or oxygen enriched air, and the second internal longitudinal volume (17) transports fuel.

12. The submerged combustion burner of claim 1, wherein a flange (7) is arranged around the parallelepipedic burner body (3) at a distance from the melt oriented face (5) of the parallelepipedic burner body (3) for positioning the submerged combustion burner (1) to a submerged combustion melter bottom or sidewall below the level of the melt.

13. A submerged combustion melter (100) comprising a melter bottom and sidewalls, a raw material discharge (110), a melt outlet (109) and at least one submerged combustion burner (1) of claim 1 arranged below the level of the melt (103).

14. The submerged combustion melter of claim 13, wherein the submerged combustion melter (100) comprises about 2 to about 20 submerged combustion burners (1).

15. The submerged combustion melter of claim 13, comprising a glass melter in which the submerged combustion burner(s) (1) are arranged at the bottom of the submerged combustion melter (100).

16. The submerged combustion melter of claim 15, wherein the glass melter produces one or more of glass fibers, mineral wool fibers, glass wool and stone wool fibers.

17. The submerged combustion melter of claim 13, wherein the melting chamber is cylindrical and comprises a melting chamber inner diameter of about 1.5 m to about 3 m, and a melt height of about 0.75 m to about 2.2 m.

18. The submerged combustion burner of claim 1, wherein the longitudinal slot (9) comprises an opening of about 15 to about 25 mm.

* * * * *